(12) United States Patent
Yin

(10) Patent No.: US 6,754,633 B1
(45) Date of Patent: Jun. 22, 2004

(54) ENCODING A CODE SIGNAL INTO AN AUDIO OR VIDEO SIGNAL

(75) Inventor: Jia Hong Yin, London (GB)

(73) Assignee: Central Research Laboratories Limited, Middlesex (GB)

(*) Notice: Subject to any disclaimer, the term of this patent is extended or adjusted under 35 U.S.C. 154(b) by 0 days.

(21) Appl. No.: 09/806,579

(22) PCT Filed: Oct. 4, 1999

(86) PCT No.: PCT/GB99/03276

§ 371 (c)(1),
(2), (4) Date: Jun. 14, 2001

(87) PCT Pub. No.: WO00/21227

PCT Pub. Date: Apr. 13, 2000

(51) Int. Cl.[7] .............................................. G10L 19/00
(52) U.S. Cl. ...................... 704/273; 704/500
(58) Field of Search ................. 704/273, 500; 713/193

(56) References Cited

U.S. PATENT DOCUMENTS 5,764,763 A    6/1998 Jensen et al.

6,389,055 B1 * 5/2002 August et al. ............... 375/130

FOREIGN PATENT DOCUMENTS

| EP | 0366381 | 5/1990 |
|----|---------|--------|
| WO | WO 96/21290 | 7/1996 |
| WO | WO 97/31440 | 8/1997 |

OTHER PUBLICATIONS

UK Search Report under Section 17, Examiner John Betts, Sep. 8, 1999.

* cited by examiner

*Primary Examiner*—Daniel Abebe
(74) *Attorney, Agent, or Firm*—William H. Bollman

(57) ABSTRACT

There is provided an apparatus and method for encoding a code signal particularly into an audio signal. Previously as a result of data compression protocol codes hidden into "sync periods" have been degraded or lost as a result of, for example, low pass filtering. Sometimes, during quiet intervals codes were audible. The invention overcomes the problem of encoding a code into an audio signal by sampling the audio signal in order to determine its energy content and embedding the code into a suitable portion of the audio signal so that the code is hidden within a sufficiently energetic portion of audio signal. The advantage is that code is never audible.

9 Claims, 3 Drawing Sheets

ENCODING A CODE SIGNAL INTO AN AUDIO OR VIDEO SIGNAL

BACKGROUND OF THE INVENTION

1. Field of the Invention

The present invention relates to an apparatus for, and method of, encoding a signal. More particularly, but not exclusively, the signal is representative of data of the type used to produce an image or an audible tone.

2. Background

In broadcasting and telecommunications data can be in either digital or analog form. Increasingly data is transmitted in digital form. One reason for this is because larger amounts, of data can be transmitted in digital form than in analog form. Another is because digital signals are less prone to interference and can easily be recovered by using error correction techniques if they are distorted. However, as side effects of facile access to digital data, complaints of violation of copyright and tampering or modification of content are daily increasing.

It is known to insert special codes into data representing images, for example digital video signals for transmission or stills transmitted across a telecommunication link. One reason for doing this is to identify the owner of copyright in the images. A number of schemes exist for inserting identification codes into so-called "sync periods". More recently it has been proposed to insert identification codes into the image itself, but in such a manner so that the code cannot be detected by a viewer. Similar schemes exist for inserting code into audio data.

U.S. Pat. No. 4,238,849 (ISE) describes a method of transmitting an additional data message, with a main data message via a single channel at a predetermined bandwidth. The additional data message is transmitted by modulating a sideband outside the baseband but within an inaudible tone spectrum masked by the main message.

Currently schemes suffer from the disadvantage that coded digital information cannot easily be transformed and maintain its integrity. Low pass filtering and other processes, such as data compression, may occur in compression algorithms or transmission of audio signals across a telecommunication links and such transforms may remove the code or degrade it to an extent where it cannot be recognised.

In the Applicant's published International Patent Application WO-A1-9625005 (Todd), there is described a method of coding data into an image. The method of coding and decoding information into an image, comprises: dividing the image into M×N blocks, selectively encoding information into selected blocks in such a way as not to be visible to the eye, wherein in a decoding stage, the decoding is synchronised to the occurrence of the blocks for analysis of image information. In a preferred embodiment the size of insertions and their positions are fixed by processing the image in a block-by-block manner, typically with a block size of 8 by 8 pixels.

Devices for inserting an inaudible, unique identification code into a piece of audio data, also exist. In the Applicant's published, pending International Patent Application, WO-A1-9621290 (Best et al), there is described an apparatus and method for labelling a stereophonic audio signal with a code.

One technique embeds codes into two notches (around 3 kHz) when there is enough audio energy to mask the codes. A masking filter, which covers the notches and a region below the notches, in the frequency domain, is used to analyse audio energy around the frequency of the notches. A code may be placed into the notches if the ratio of the energy in the notches (and that of the masking filter) exceeds a predetermined threshold. However, even though that condition is satisfied, the codes may not always be properly masked and therefore can become audible for some types of audio data, especially when the code energy level is high.

Although the aforementioned devices and methods proved successful in many types of embedded code in music, the embedded code signal was still audible in certain circumstances. This is because either there was sufficient audio energy around the notches to hide the code, or the amplitude of code signal is too high. Because a large percentage of energy of many types of sound is in the area below 3 kHz (for example energy in the speaking human voice) and the energy in the masking filter is not sufficently large, code is sometimes audible. This may occur even if there appears to be sufficient energy around the notches to hide the codes. For example, if an audible signal ($E_N$) is removed from notch frequency and a code is inserted, a listener cannot usually distinguish between the code and say, music. However, in an event when no musical note is present then a listener can hear the audible code.

The present invention arose in order to solve the foregoing problems, particularly with regard to the audibility of embedded codes.

SUMMARY OF THE INVENTION

According to a first aspect of the present invention there is provided apparatus for encoding a code signal into a signal, for example for identifying said audio signal, the apparatus comprising means for determining an amount of energy within a first frequency band of audio signal; means for determining an amount of energy within a second frequency band of audio signal; means for determining an amount of energy within at least two notch frequency bands; means for generating a code signal to be embedded with a particular energy content; means for comparing the energy from said first and second bands with the energy from said notch frequency bands in order to determine whether to insert the code signal into the chosen notch frequency bands; and means for removing a portion of the signal and replacing it with said code signal if so determined.

Preferably means for automatically controlling an amplitude of the code signal in an encoder, by the amount of energy in the first frequency band or/and that in the second frequency band, are also provided. Means is advantageously provided for automatic gain control in the decoder. Automatic gain control by the amount of energy in the first frequency band and/or that in the second frequency band may also be provided.

The first and second means for determining energy may be combined with different frequency bands (and therefore different energies). This choice may be determined by way of a switching function and/or buffer which stores information about the energy of each sampled band. The switching function can be arranged to shift a sampling band. This may be achieved digitally, for example under control of a microprocessor.

Means may be provided for determining frequency bands of notches at which a code signal is to be inserted. Accordingly, some form of variable frequency encoding means may be required to shift a coding frequency band from a first frequency ($f_1$) to a second frequency ($f_2$) or to other frequencies A particularly elegant switching function involves shifting two sampling filters. These are hereinafter referred to as a High Frequency Mask Filter (HFMF) and a Low Frequency Mask Filter (LFMF) respectively. The filters are preferably capable of operating over substantially identical frequency ranges one to another.

A High Frequency Masking Filter (HFMF) is intended to analyse audio energy in that frequency range or band in order to check whether or not codes can be masked properly. The HFMF preferably extents to notch (and frequency ranges) higher than in the frequency domain. The function governing the LFMF characteristics may be similar to that of a HFMF. This may be achieved practically by "flipping" HFMF characteristics horizontally and shifting the curve, so that the HFMF effectively extends across the same, or substantially same, frequency band, including the notch frequencies but extending to a lower frequency region.

There are two possible methods envisaged for using the HFMF for making a decision where to insert a code signal into an audio signal:

1) The first involves using the HFMF alone. A code signal is embedded into the notches when the ratio of energy in the notch bands and that of HFMF reaches a threshold. In general, audio energy is mainly present at or around a low frequency band. Thus the codes are properly hidden if there is enough energy in the HFMF. If this is not possible then a second method uses a HFMF in combination with a LFMF. A code signal can be embedded into the notch when both ratios (the ratio of energy in the notch band and that of the HFMF and the ratio of energy in the notch band and that of the LFMF) reach their corresponding thresholds.

An indication of energy content of the signal may be provided by integrators across each frequency band and automatic comparators may provide a digital value. These comparisons are preferably achieved under control of a micro-processor.

To control automatically the amplitude of a code signal, the energy from the HFMF or/and that from the LFMF can be used to control a code signal amplifier, in the encoder, so that the level of the code signal varies depending on the energy around the region where the code signal is inserted. Thus the code signal may be masked properly and is never audible.

In the decoder where the same HFMF or/and LFMF can be used, the energy from the HFMF or/and the LFMF is/are used to automatically the gain of an amplifier for the encoded audio signal, so that the embedded codes can be correctly detected.

BRIEF DESCRIPTION OF THE DRAWINGS

An embodiment of the invention will now be described, by way of an example only, and with reference to the Figures in which.

DETAILED DESCRIPTION OF ILLUSTRATIVE EMBODIMENTS

Figure 1:
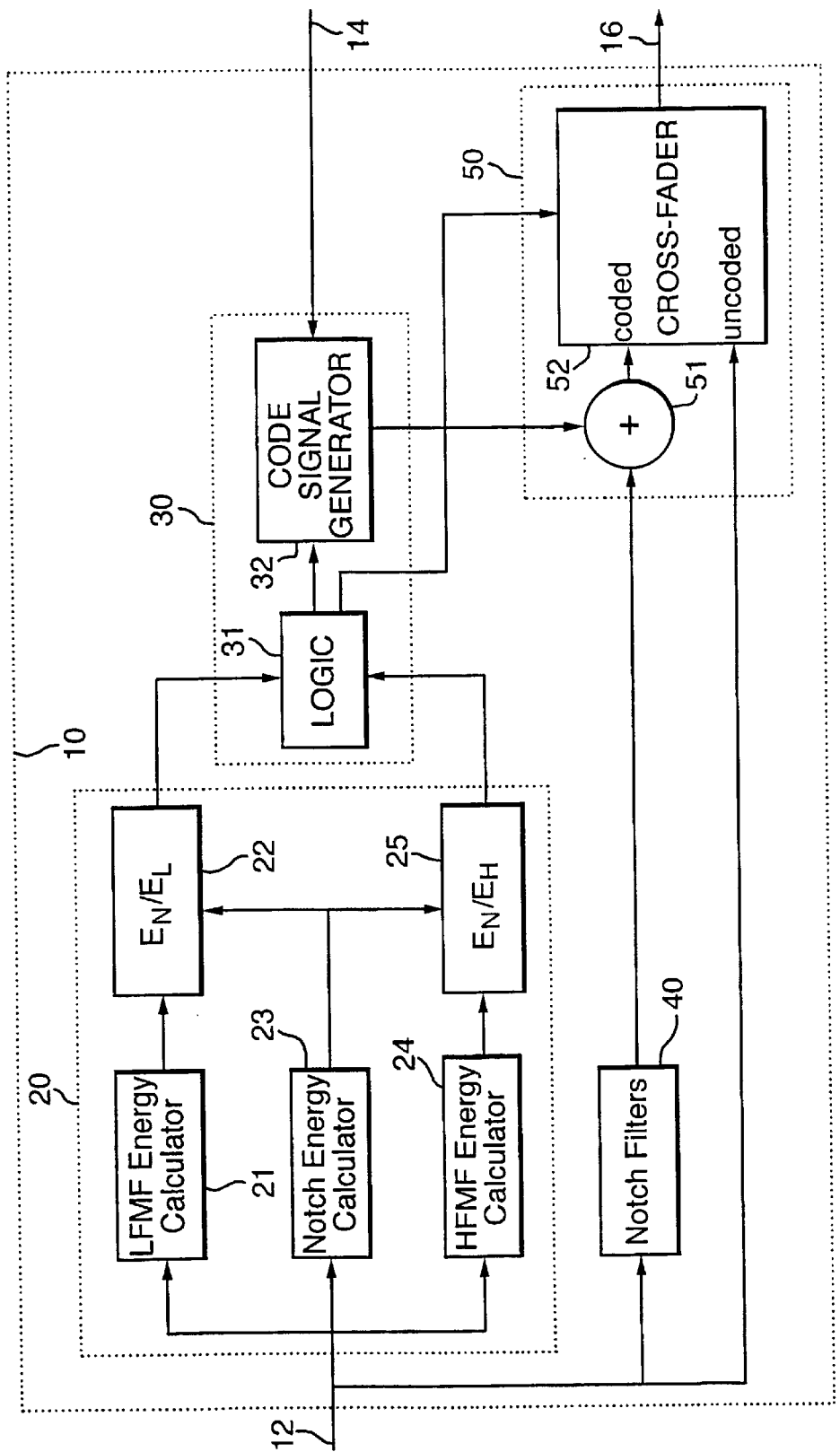
FIG. 1 is a block diagrammatical view of an apparatus for encoding an audio signal.

Referring to the Figures, FIG. 1 shows an apparatus 10 for encoding an audio signal 12 with a code 14 (not shown). Input signal 12 is sampled by sampler 20. Sampler 20 comprises a LFMF energy calculator 21 and a comparator 22; a HFMF energy calculator 24 and a comparator 25; and a notch energy calculator 23. The LFMF energy calculator 21, HFMF energy calculator 24 and Notch Energy Calculator 23 include LFMF, HFMF and Band-pass Filters respectively and separate energy calculators. The energy calculators estimate the amounts of output energy of each of LFMF, HFWF and Band-pass filters respectively from the input signal 12. Comparator 22 is fed with results from energy calculators 21 and 23, and comparator 25 with results from energy calculators 23 and 24.

Figure 4:
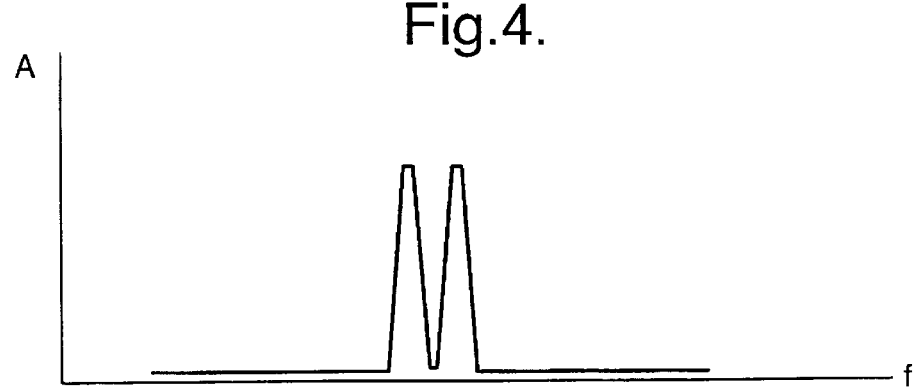
FIG. 4 and FIG. 5 show graphically band pass filters covering the notch frequency bands and HFMF and LFMF respectively.
Figure 5:
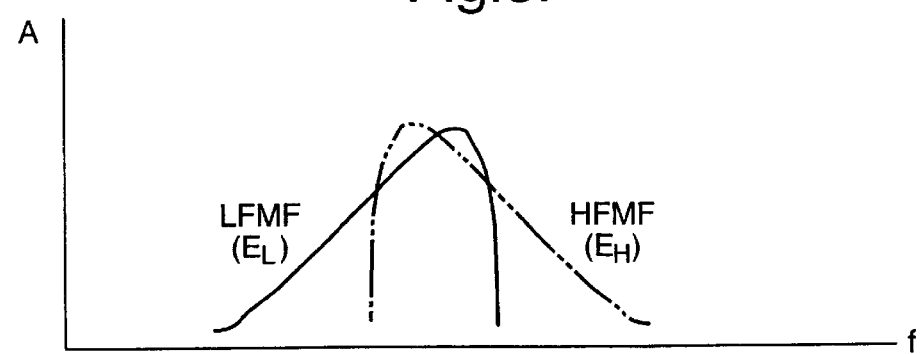

FIGS. 4 and 5 show diagrammatically how energy levels in different frequency bands are determined.

Figure 2:
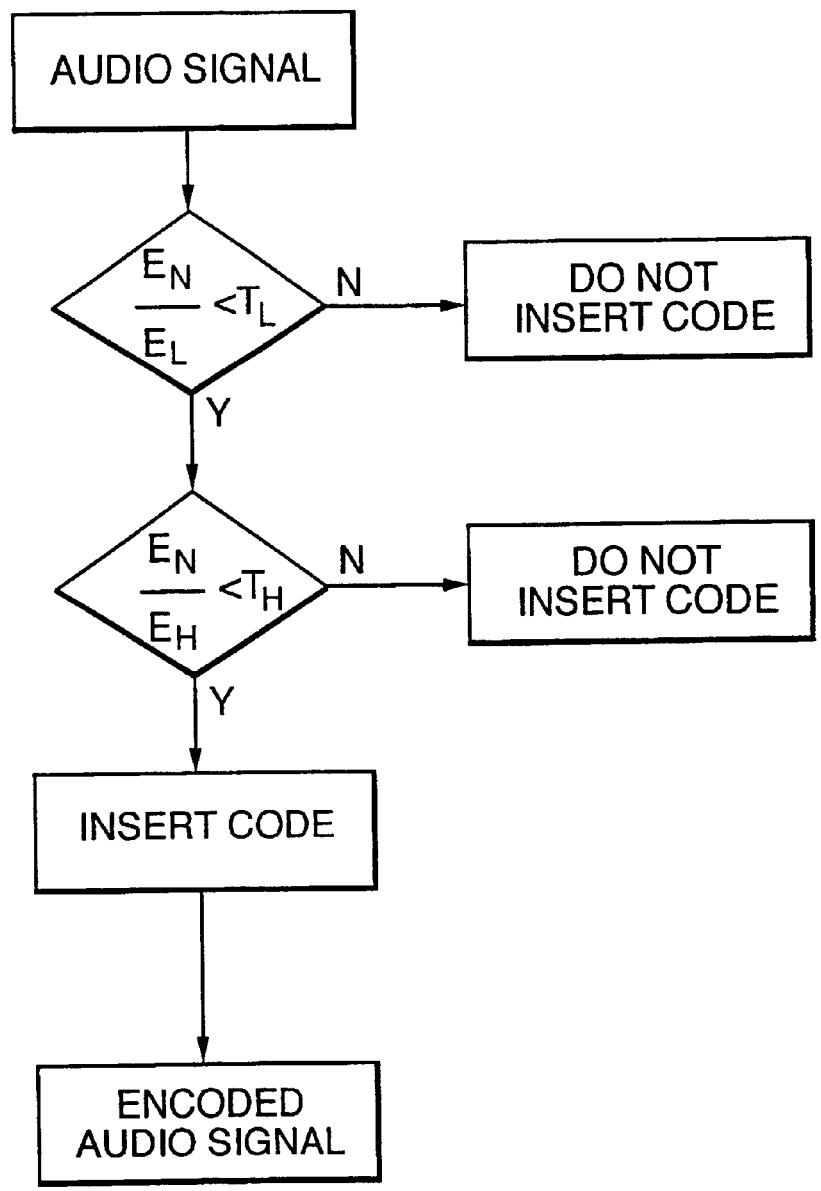
FIG. 2 is a flow diagram representing how a decision of code insertion operates.

The inputs of comparators 22 and 25 are the energy values, $E_L$ and $E_N$, and $E_H$ and $E_N$ respectively. These values are estimated from the filters represented graphically in FIGS. 4 and 5. The ratios of $E_N/E_L$ and $E_N/E_H$ are compared with respective thresholds, $T_L$ and $T_H$ which are stored in comparators 22 and 25 respectively. The results of the comparison are then sent to microprocessor 31. Thresholds $T_L$ and $T_H$ represent the maximum ratios of notch energy: energy of (respectively) low and high masking filters, above which ratios code would be audible. These thresholds may be predetermined, for example by trial and error, for any particular system and once obtained remain constant for that system. They may therefore be stored in memory of a microprocessor until modification is required. According to inputs received from both comparators 22 and 25, microprocessor 31 makes a decision whether or not to embed a code signal into the notch(es) and whether there is sufficient energy to enable the code to be masked by an audio signal around the frequency of the notch(es). An example of such a decision making process is shown diagrammatically in FIG. 2.

Figure 3:
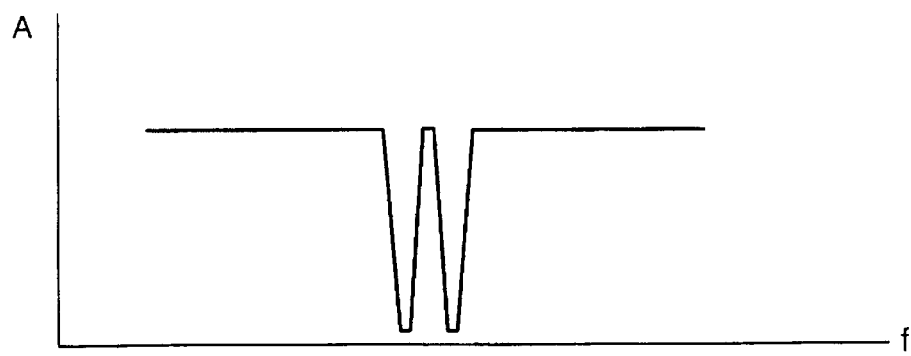
FIG. 3 show graphically, notches were a code signal is embedded.

A code carrier signal is generated in Code Signal Generator 32 upon command of microprocessor 31 using code 14. Notch filters 40, whose characteristics are represented in FIG. 3, remove data in the notch frequency bands from the audio signal. The removed audio signal is with the code carrier signal which contains code 14.

Output 16 of a cross-fader 50 is either the coded audio signal or the uncoded audio signal as determined by microprocessor 31. Thus the embedded code signal can be filtered out and the code 14 can be recovered in a decoder (not shown).

If only an HFMF is used, LFMF Energy Calculator 21 and Comparator 22 should be removed from FIG. 1, but otherwise the embodiment remains unaltered.

Apparatus 10 can be implemented by software, and may also be implemented in hardware, such as, for example, a single Field Programmable Gate Array (FPGA) or a dedicated chip.

The invention has been described by way of example only and variation may be made to the embodiment described without departing from the scope of the invention. A method of encoding a signal is also described.

What is claimed is:

1. Apparatus for encoding a code signal into an audio signal, the apparatus comprising:

means for determining an amount of energy within a first frequency band of said audio signal including a high frequency mask filter having a first asymmetric transfer characteristic;

means for determining an amount of energy within a second frequency band of said audio signal including a low frequency mask filter having a second asymmetric transfer characteristic being a mirror image of said first transfer characteristic;

means for determining an amount of energy within at least two notch frequency bands;

means for generating a code signal to be embedded with a particular energy content;

means for comparing the energy from said first and second bands with the energy from said notch frequency bands in order to determine whether to insert the code signal into the chosen notch frequency bands; and means for removing a portion of the audio signal and replacing it with said code signal if so determined.

2. Apparatus for encoding a code signal into an audio signal according to claim 1, further comprising: means for automatically controlling a peak amplitude of the code signal.

3. Apparatus for encoding a code signal into an audio signal according to claim 1, further comprising:

means for automatically controlling the amplitude of the code signal in the encoder by the amount of energy in the second frequency band.

4. Apparatus for encoding a code signal into an audio signal according to claim 1, further comprising:

means for automatic gain control in the decoder.

5. Apparatus for encoding a code signal into an audio signal according to claim 4, wherein:

the means for automatic gain control in the decoder monitors the amount of energy in the first and the second frequency band.

6. Apparatus for encoding a code signal into an audio signal according to claim 1, wherein:

energy in the first and second frequency bands is determined by way of a switching device which stores information about peak and total energy content of each band.

7. Apparatus for encoding a code signal into an audio signal according to claim 6, wherein the switching device comprises:

two sampling filters, capable of operating over substantially identical frequency ranges.

8. Apparatus for encoding a code signal into an audio signal according to claim 1, further comprising:

means for shifting a coding frequency band from a first frequency to a second frequency.

9. A method of encoding a code signal into an audio signal, said method comprising:

determining an amount of energy within a first frequency band of said audio signal including a high frequency mask filter having a first asymmetric transfer characteristic;

determining an amount of energy within a second frequency band of said audio signal including a low frequency mask filter having a second asymmetric transfer characteristic being a mirror image of said first transfer characteristic;

determining an amount of energy within at least two notch frequency bands;

generating a code signal to be embedded with a particular energy content;

comparing the energy obtained from said first and second bands with the energy obtained from notch bands in order to determine whether the code signal can be inserted into the chosen notches; and means for removing a portion of the audio signal and replacing it with said code signal.

* * * * *